(12) United States Patent
Morikawa et al.

(10) Patent No.: US 8,141,431 B2
(45) Date of Patent: Mar. 27, 2012

(54) LOAD SENSOR HAVING LOAD DETECTION ELEMENT AND SUPPORT ELEMENT AND METHOD FOR MANUFACTURING THE SAME

(75) Inventors: Kenji Morikawa, Hekinan (JP); Hideyuki Hayakawa, Nishio (JP)

(73) Assignee: Denso Corporation, Kariya (JP)

( * ) Notice: Subject to any disclaimer, the term of this patent is extended or adjusted under 35 U.S.C. 154(b) by 524 days.

(21) Appl. No.: 12/378,786

(22) Filed: Feb. 19, 2009

(65) Prior Publication Data

US 2009/0211365 A1    Aug. 27, 2009

(30) Foreign Application Priority Data

Feb. 21, 2008  (JP) .................................. 2008-040475

(51) Int. Cl.
*G01L 1/00* (2006.01)
*H01R 43/00* (2006.01)
(52) U.S. Cl. ................. 73/774; 73/777; 73/775; 29/516; 29/825
(58) Field of Classification Search ........... 73/862.041–862.046, 775, 774, 73/777; 29/516, 825
See application file for complete search history.

(56) References Cited

U.S. PATENT DOCUMENTS

| | | | |
|---|---|---|---|
| 6,279,395 B1 * | 8/2001 | Insalaco et al. ............. | 73/514.34 |
| 6,843,132 B2 * | 1/2005 | Mizuno et al. .................. | 73/715 |
| 6,997,060 B2 | 2/2006 | Morikawa | |
| 7,059,203 B2 | 6/2006 | Asai et al. | |
| 7,427,720 B2 * | 9/2008 | Furukawa et al. ............ | 177/211 |
| 7,444,889 B2 * | 11/2008 | Wehinger et al. ........ | 73/862.637 |
| 2004/0000195 A1 * | 1/2004 | Yanai et al. ...................... | 73/717 |
| 2004/0182144 A1 * | 9/2004 | Okazaki et al. ............... | 73/118.1 |
| 2004/0231425 A1 * | 11/2004 | Mizuno et al. .................. | 73/715 |
| 2005/0061643 A1 * | 3/2005 | Rainey ......................... | 200/85 A |
| 2005/0103124 A1 * | 5/2005 | Asai et al. ................ | 73/862.046 |
| 2005/0173904 A1 * | 8/2005 | Morikawa ..................... | 280/735 |

(Continued)

FOREIGN PATENT DOCUMENTS

JP             9-329520           12/1997

(Continued)

OTHER PUBLICATIONS

Plastic Deformation. The Chemistry Dictionary. [Acessed] Aug. 15, 2011. <http://www.chemistry-dictionary.com/definition/plastic+deformation.html>.*

(Continued)

*Primary Examiner* — Lisa Caputo
*Assistant Examiner* — Jonathan Dunlap
(74) *Attorney, Agent, or Firm* — Harness, Dickey & Pierce, PLC (57) ABSTRACT

A method for manufacturing a load sensor including a load detection element and a support element is provided. The support element includes a base and a spring. The spring includes a support portion, a connection portion bonding to the base, and a connecting member coupling the support portion and the connection portion. The support element transmits a detection load to the load detection element via the base and the spring. The method includes: sandwiching the load detection element between the base and the support portion; bonding the connection portion on the base so that the connecting member is deformed beyond the elastic deformation region to reach the plastic deformation region; pressing the support portion so that a contact surface of the support portion is plastically deformed; and returning deformation of the connecting member to be in the elastic deformation region.

13 Claims, 4 Drawing Sheets

U.S. PATENT DOCUMENTS

| | | | |
|---|---|---|---|
| 2005/0193828 A1* | 9/2005 | Morikawa | 73/777 |
| 2006/0090566 A1* | 5/2006 | Oda | 73/715 |
| 2009/0001850 A1* | 1/2009 | Kalinin et al. | 310/313 R |
| 2009/0013801 A1* | 1/2009 | Yamashita et al. | 73/862.045 |
| 2009/0039903 A1* | 2/2009 | Inomata | 324/754 |
| 2009/0241690 A1* | 10/2009 | Hayakawa et al. | 73/862.046 |
| 2009/0243245 A1* | 10/2009 | Hayakawa et al. | 280/93.5 |

FOREIGN PATENT DOCUMENTS

| | | |
|---|---|---|
| JP | 09329520 A * | 12/1997 |
| JP | 11-037860 | 2/1999 |
| JP | 2003-057127 | 2/2003 |
| JP | 2005-172793 | 6/2005 |
| JP | 2005-249598 | 9/2005 |
| JP | 2007-107963 | 4/2007 |
| JP | 2007-240205 | 9/2007 |

OTHER PUBLICATIONS

European Search Report dated Jun. 14, 2010 in corresponding European patent application No. 09002205.4.

Office Action dated Mar. 2, 2010 in corresponding Japanese Application No. 2008-040475.

* cited by examiner

LOAD SENSOR HAVING LOAD DETECTION ELEMENT AND SUPPORT ELEMENT AND METHOD FOR MANUFACTURING THE SAME

CROSS REFERENCE TO RELATED APPLICATION

This application is based on Japanese Patent Application No. 2008-40475 filed on Feb. 21, 2008, the disclosure of which is incorporated herein by reference.

FIELD OF THE INVENTION

The present invention relates to a load sensor including a load detection element and a support element for detecting a load with high accuracy and a method for manufacturing a load sensor.

BACKGROUND OF THE INVENTION

A conventional load detection sensor includes a pressure sensitive member and an electrically insulation member. The sensor is disclosed in JP-A-2005-172793, which corresponds to U.S. Pat. No. 7,059,203. The pressure sensitive member has electric characteristics, which are changeable in accordance with stress applied to the sensor. The electrically insulation member is integrally formed on both sides of the pressure sensitive member. The pressure sensitive member is made of glass matrix including conductive particles dispersed in the matrix. The conductive particles are made of, for example, $RuO_2$. The thickness of the pressure sensitive member is in a range between 1 μm and 200 μm. A pair of electrodes is disposed on the pressure sensitive member.

A preliminary load may be applied to the load detection sensor so that not only a load along with a pressing direction but also a load along with a tensile direction is measured. This is disclosed in JP-A-2005-249598 corresponding to U.S. Pat. No. 6,997,060 and JP-A-H11-37860.

However, although JP-A-2005-249598 and JP-A-H11-37860 teaches effects of the preliminary load application, a specific method for applying the load preliminary is not described in JP-A-2005-249598 and JP-A-H11-37860.

The magnitude of the preliminary load application has an appropriate range, and it is necessary to control the magnitude of the preliminary load application according to dimensions of an individual part. The load detection sensor does not have sufficient durability against a rotation torque, compared with compression. When the method for controlling the magnitude of the preliminary load application is a screw method disclosed in JP-A-2005-249598 and JP-A-H11-37860, both of the preliminary load and a rotation torque are applied to the load detection sensor.

The load detection sensor has high rigidity in the compression direction. The screw method does not provide to apply the preliminary load sufficiently. When a screw is loosened, the preliminary load is much reduced. Further, the magnitude of the preliminary load is varied according to accuracy of a surface on which the screw contacts. However, it is difficult to form the surface having sufficient accuracy for securing the sufficient preliminary load. The preliminary load is applied to a small area of the surface, so that durability of the surface is reduced.

SUMMARY OF THE INVENTION

In view of the above-described problem, it is an object of the present disclosure to provide a load sensor including a load detection element and a support element for detecting a load with high accuracy and sufficient durability. It is another object of the present disclosure to provide a method for manufacturing a load sensor.

According to a first aspect of the present disclosure, a method for manufacturing a load sensor including a load detection element and a support element, wherein the support element includes a base for mounting the load detection element on one side of the base and a spring for applying a preliminary load on the load detection element, wherein the spring includes a support portion for sandwiching the load detection element between the one side of the base and the support portion, a connection portion bonding to the base, and a connecting member for coupling the support portion and the connection portion, and wherein the support element transmits a detection load to the load detection element via the base and the spring, the method includes: sandwiching the load detection element between the base and the spring; bonding the connection portion of the spring on the base so that the connecting member of the spring is deformed beyond the elastic deformation region to reach the plastic deformation region; pressing the support portion so that a contact surface of the support portion is plastically deformed, wherein the contact surface contacts the load detection element; and returning deformation of the connecting member to be in the elastic deformation region.

In the bonding the spring on the base, the connecting member of the spring is deformed beyond the elastic deformation region to reach the plastic deformation region, and thereby, variation of parts in the load sensor is adjusted or controlled. Further, the contact surface of the support portion is plastically deformed, so that the deformation of the connecting member is returned to be in the elastic deformation region. Thus, durability of the spring is improved, and durability of the load sensor is improved.

Here, the preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

According to a second aspect of the present disclosure, a load sensor includes: a load detection element; and a support element. The support element includes a base and a spring. The load detection element is mounted on one side of the base. The spring includes a support portion for sandwiching the load detection element between the one side of the base and the support portion, a connection portion connecting to the base, and a connecting member for coupling the support portion and the connection portion. The support portion includes a contact surface, which is plastically deformed. The contact surface contacts the load detection element. The spring is deformed so that the spring applies a preliminary load on the load detection element. The deformation of the spring provides to maintain the deformation of the connecting member within the elastic deformation region when a detection load has a predetermined variation range, and the support element transmits the detection load to the load detection element via the base and the spring.

In the above sensor, the deformation of the connecting member is in the elastic deformation range, so that the spring has excellent durability, and the preliminary load is applied to the load detection element stably. The preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

According to a third aspect of the present disclosure, a method for manufacturing a load sensor including a load detection element and a support element, the method includes: mounting the load detection element on one side of a base of the support element; sandwiching the load detection element between the one side of the base and a support portion of a spring of the support element; applying a first preliminary load on the load detection element via the support portion of the spring so that a dent is formed on a contact surface of the support portion, wherein the contact surface contacts the load detection element; applying a second preliminary load on a connection portion of the spring so that the connection portion contacts the base so that a connecting member of the spring is deformed beyond the elastic deformation region to reach the plastic deformation region, wherein the connecting member couples the support portion and the connection portion; bonding the base and the connection portion; applying a third preliminary load on the support portion via the support portion so that the contact surface of the support portion is plastically deformed and the dent on the contact surface becomes large; and returning deformation of the connecting member to be in the elastic deformation region. The support element transmits a detection load to the load detection element via the base and the spring.

The connecting member of the spring is deformed beyond the elastic deformation region to reach the plastic deformation region, and thereby, variation of parts in the load sensor is adjusted or controlled. Further, the contact surface of the support portion is plastically deformed, so that the deformation of the connecting member is returned to be in the elastic deformation region. Thus, durability of the spring is improved, and durability of the load sensor is improved.

The preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
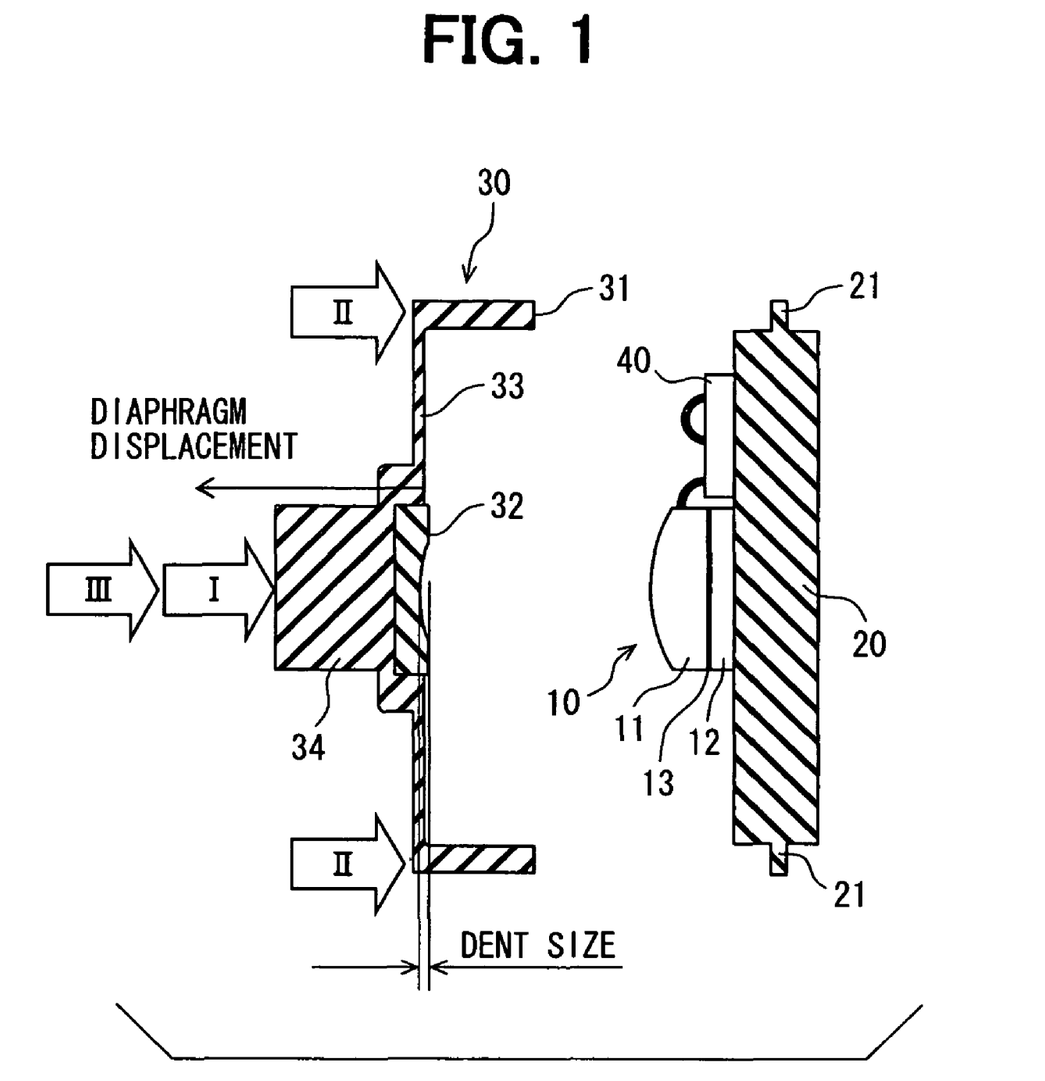
FIG. 1 is an exploded diagram showing a method for manufacturing a load sensor according to an example embodiment.

A load sensor according to an example embodiment is shown in FIG. 1. The sensor includes a load detection element 10, a support member such as a base 20 and a spring 30 and other parts such as a signal processor 40.

The load detection element 10 includes a pair of frames 11, 12 made of insulation material, and a pressure sensitive element 13, which is sandwiched between the frames 11, 12 and is formed from a thin film. The insulation material of the frames 11, 12 is, for example, ceramics having high rigidity such as alumina, $ZrO_2$, $MgAl_2O_4$, $SiO_2$, $3Al_2O_3.2SiO_2$, $Y_2O_3$, $CeO_2$, $La_2O_3$, and $Si_3N_4$. Alternatively, the frames 11, 12 may be formed of an insulation film coating metal, which is insulated by the insulation film.

The pressure sensitive element is made of material having electric properties changeable in accordance with a load applied to the element from an external device. For example, the pressure sensitive element is made of glass matrix with conductive particles dispersed in the glass matrix. The glass matrix is made of borosilicate lead glass. The conductive particles are made of $RuO_2$, lead ruthenate, or the like. Preferably, the conductive particles are made of $RuO_2$.

In the load detection element 10, the pressure sensitive element is formed by a doctor blade method, an extrusion molding method, a printing method such as a screen printing method and a transfer method. Specifically, the pressure sensitive element is formed such that $RuO_2$ particles together with foaming material and/or reinforcement material are dispersed in the glass matrix so that composite material is formed. Further, organic binder and/or solvent are added in the composite material, and they are processed to a paste. Then, the paste is shaped and sintered. Thus, the load detection element 10 is formed. The organic binder is made of cellurose resin or acrylic resin. The solvent is made of terpineol, butyl carbitol acetale, or the like.

The organic binder and the solvent generate an air hole in the pressure sensitive element when the binder and the solvent are dried and delipidated in a heating step. Thus, the organic binder and the solvent function as an air hole forming member. The foaming material is made of organic foaming material such as azodicarbonamide or an inorganic foaming material.

When the air hole is formed in the pressure sensitive element, the apparent Young's modulus of the pressure sensitive element is reduced. Thus, the strain caused by the stress increases, so that the sensitivity of the load detection element 10 is improved. The air hole is easily and generally formed when the pressure sensitive element is formed in a sintering step, i.e., a heating step. Alternatively, the foaming material such as the organic or inorganic foaming material may be added in the raw material of the pressure sensitive element, and the foaming material foams in case of sintering so that the air hole is formed.

When the pressure sensitive element is formed by the sintering method, the glass in the raw material of the pressure sensitive element melts so that the matrix made of glass is formed when the element is heated. The air hole in the melted glass becomes to have a spherical shape. It is preferred that the air hole has a spherical shape since stress concentration partially applied to the air hole is reduced. As a result, the load detection element 10 is prevented from being damaged and broken.

The insulation member may be formed by a doctor blade method or an extrusion molding method. The insulation member may be formed by the same process as the pressure sensitive element, or formed by a different process from the pressure sensitive element.

The pressure sensitive element and the insulation member are integrated. The pressure sensitive element and the insulation member may be integrated in the sintering process. Alternatively, the pressure sensitive element may be bonded to the insulation member with adhesion such as low melting point glass.

The load detection element 10 may be formed of Zirconia and $La_{1-x}Sr_xMnO_3$ ($0 \leq X \leq 1$) as main material. Here, the material $La_{1-x}Sr_xMnO_3$ ($0 \leq X \leq 1$) has pressure-resistant effect. The Zirconia particles function as a matrix material, and the $La_{1-x}Sr_xMnO_3$ particles are dispersed such that the $La_{1-x}Sr_xMnO_3$ particles are electrically coupled with each other. Thus, ohmic resistance of the element 10 is changed in accordance with the load applied to the element 10, and the load is detected based on the ohmic resistance of the element 10. The Zirconia particles have excellent heat resistance, so that temperature change in the element 10 is not generated. Thus, detection error is not caused by the temperature change in the element 10. Further, the Zirconia particles have high toughness, so that the sensor has high durability against the load and pressure. When the strength of the load detection element 10 increases, the rigidity of the sensor is improved.

The base 20 has a disk shape, and the load detection element 10 is fixed to a center portion of the base 20 on one side of the base 20. A flange 21 is disposed on an outer periphery of the base 20. The base 20 has rigidity higher than the detection element 10 and the spring 30. The base 20 is made of carbon steel.

The spring 30 includes a connection portion 31 for connecting to the base 20, a support portion 32 for supporting the detection element 10 together with the base 20, a connecting member 33 for connecting between the support portion 32 and the connection portion 31, and a load transmission portion 34 for transmitting the load to the detection element 10. The support portion 32 is made of stainless steel such as SUS No. 304 steel and SUS No. 305 steel. Here, SUS No. 304 and SUS No. 305 are defined in Japanese Industrial Standards. The connection portion 31, the connecting member 33 and the load transmission portion 34 are made of carbon steel.

The connection portion 31 has a cylindrical shape so that one end of the connection portion 31 in an axial direction is attachable to the flange 21 of the base 20. The one end of the connection portion 31 is fixed to the base 20. A connection between the one end of the connection portion 31 and the base 20 is performed by a welding method. The connecting member 33 is a diaphragm having a thin plate shape so that the connecting member 33 covers the other end of the connection portion 31. The support portion 32 has a disk shape and is disposed on a support portion side at a center of the connecting member 33. The load transmission portion 34 has a cylindrical shape and is disposed opposite to the support portion 32 at the center of the connecting member 33.

The spring 30 can be deformed until the connecting member 33 is deformed to reach a plastic deformation region. The spring 30 provides to connect the connection portion 31 contacts the flange 21 and to contact the detection element 10 on the support portion 32. The deformation of the connecting member 33 can be controlled by adjusting the length of the connection portion 31 in the axial direction. The length of the connection portion 31 is set in view of variation of parts in the sensor such that the connecting member 33 is deformed to reach the plastic deformation region in any case.

The sensor includes the signal processor 40, a wiring and a signal terminal (not shown). The processor 40 detects electric properties of the detection element 10 and outputs an electric signal in accordance with the magnitude of the load. The wiring communicates between the detection element 10 and the processor 40. The signal terminal communicates the signal with an external circuit.

A method for manufacturing the load sensor includes a connecting step and a return step.

In the connecting step, the base 20 is bonded to the spring 30. The one end of the connection portion 31 of the spring 30 is bonded to the flange 21 of the base 20 by a welding method. The connecting step is performed in a manner that the load detection element 10 is sandwiched between a center of the base 20 on the one side and the support portion 32 of the spring 30.

Figure 3:
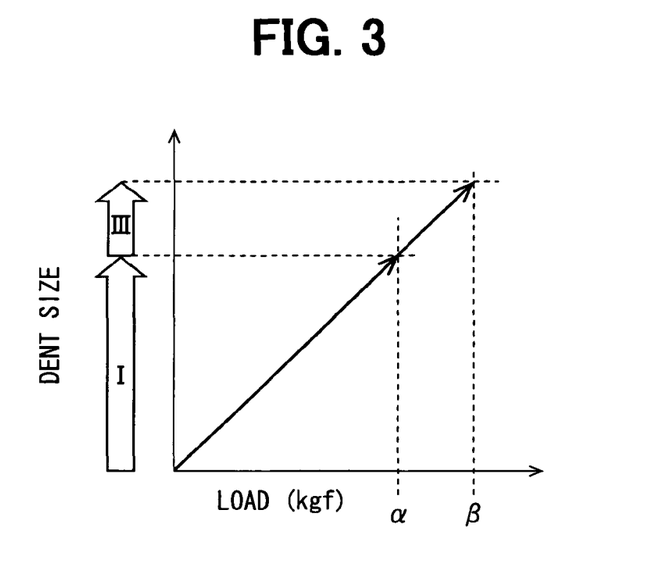
FIG. 3 is a graph showing a relationship between a load and a dent size.

The support portion 32 of the spring 30 is adhered to the detection element 10, and then, the contact surface of the support portion 32 is dented to form a predetermined dent size. The contact surface of the support portion 32 is attached to the detection element 10. Specifically, a predetermined load a is applied to the sensor so that the dent size in each sensor becomes the same. This step is shown as I in FIGS. 1 and 3. In the first step I, the dent is formed to have the dent size corresponding to the dent size I in FIG. 3. Since the dent is formed, work hardening is caused in the support portion 32, so that stability in shape is improved.

Then, one end of the connection portion 31 is pressed so that the connecting member 33 is deformed. Thus, the other end of the connection portion 31 is adhered to the flange 21, and under this condition, the other end of the connection portion 31 is bonded to the flange 21 by a welding method. This step is shown as II in FIGS. 1 and 2. The second step II provides to absorb or adjust tolerance in each part of the sensor.

Figure 4:
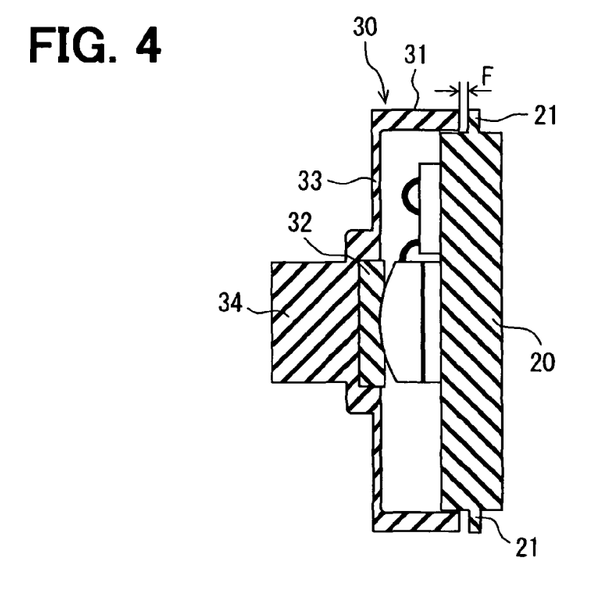
FIG. 4 is a diagram showing the method for manufacturing the load sensor.

The adjustment of the tolerance is explained as follows with the drawing of FIG. 4. As shown in FIG. 4, for example, a clearance F is formed between the other end of the connection portion 31 and the flange 21 before the one end of the connection portion 31 is pressed. This clearance F is variable in accordance with variation, i.e., tolerance in each part of the sensor. In the second step II, the connection portion 31 is displaced by the clearance F. The clearance F is set such that deformation of the connecting member 33 reaches a plastic deformation region even if the clearance F has a variation. As a result, the load to be applied to the load detection element 10 via the connecting member 33 and the support portion 32, which is a stress in the connecting member 33, becomes constant.

Figure 2:
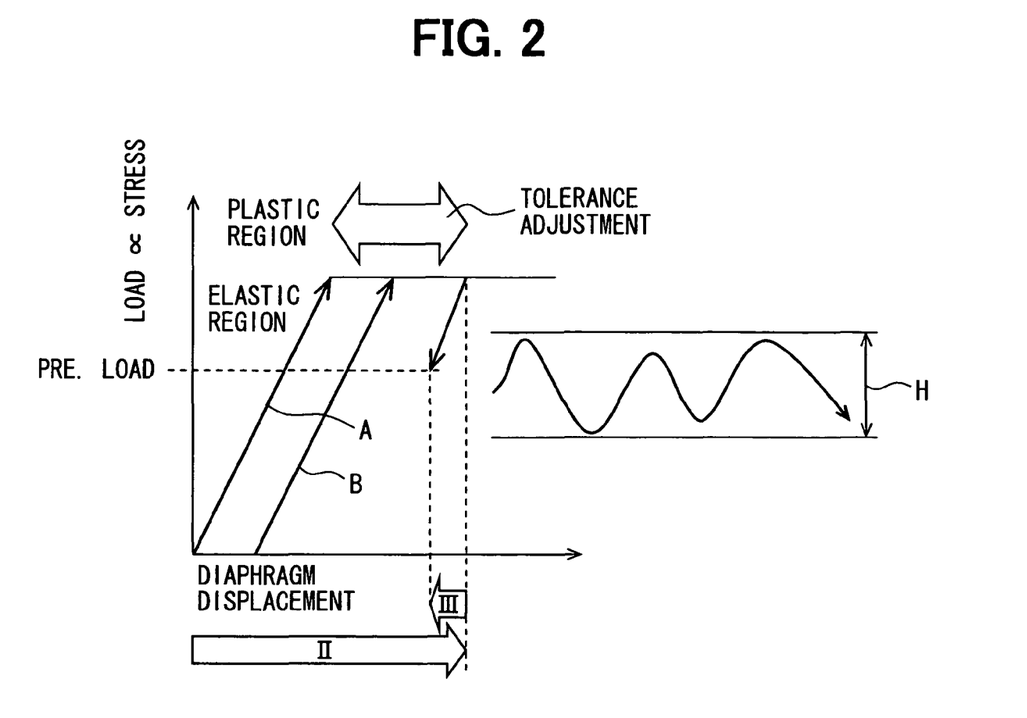
FIG. 2 is a graph showing a relationship between a load and a displacement of a diaphragm.

In FIG. 2, A represents a case where the clearance F is large, and B represents a case where the clearance F is small. When the deformation of the connecting member 33, i.e., deformation of the diaphragm 33, proceeds in accordance with displacement of the connection portion 31, the connecting member 33 deforms initially in an elastic deformation range. Then, the stress caused by the deformation exceeds a yield point. After that, the connecting member 33 deforms in a plastic deformation region. The material of the connecting member 33 in each sensor is the same, and thereby, the yield point in each sensor is also the same even when the shape of the connecting member 33 has a variation. Thus, the residual stress in the connecting member 33 of each sensor is the same without depending on the clearance F. Here, in FIG. 2, the original point of a graph B in a horizontal axis of FIG. 2 is slightly displaced from the original point of a graph A so that the graphs A and B are easily distinguished. A point of the graph B, at which the connection portion 31 is displaced and adhered to the flange 21, is the same as a point of the graph A.

In a return step, the support portion 32 is pressed so that the contact surface of the support portion 32 contacting the load detection element 10 is plastically deformed, and the dent of the contact surface of the support portion 32 is increased. The plastic deformation of the support portion 32 is performed until the deformation of the connecting member 33 returns to the elastic deformation region. As a result, the stress in the connecting member 33 is adjusted so that the preliminary load is controlled. This step is shown as III in FIGS. 1-3. Further, the support portion 32 is plastically deformed again, and thereby, the work hardening of the support portion 32 further proceeds, so that stability in shape is much improved.

The magnitude of the preliminary load is not specified. The magnitude of the preliminary load is appropriately controlled in view of a load range to be detected by the sensor. For example, the load to be detected by the sensor has a range H including a range in a pressing direction and a range in a tensile direction. When the zero point of the range H is set to the preliminary load, the deformation of the connecting member 33 is set to be disposed in the elastic deformation range. Here, the zero point of the range H is a neutral point of the range H. The deformation of the connecting member 33 is controlled by a method for controlling a load β to be applied, a method for controlling the magnitude of the deformation of the connecting member 33, a method for controlling a measurement value of the load detection element 10, or the like.

(Modifications)

Figure 5A:
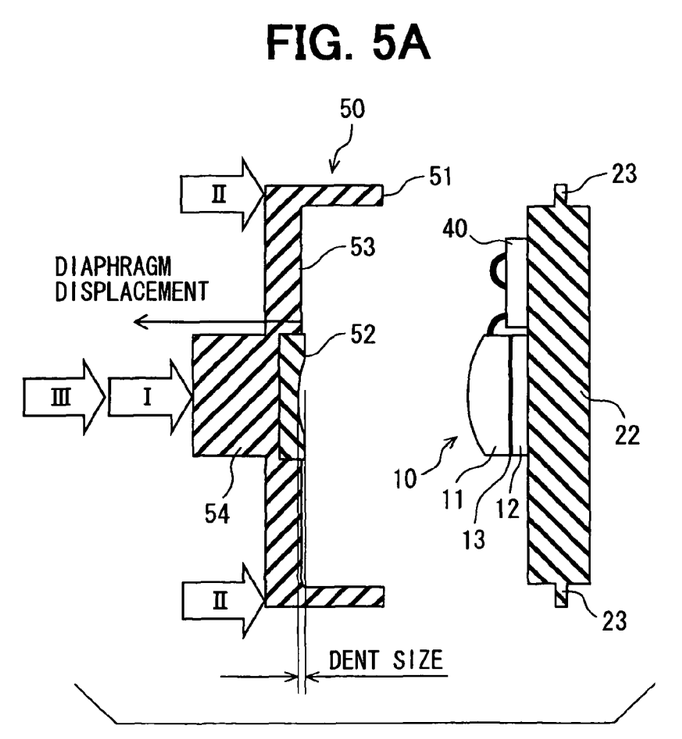
FIG. 5A is an exploded diagram showing a method for manufacturing a load sensor according to a modification of the example embodiment.
Figure 5B:
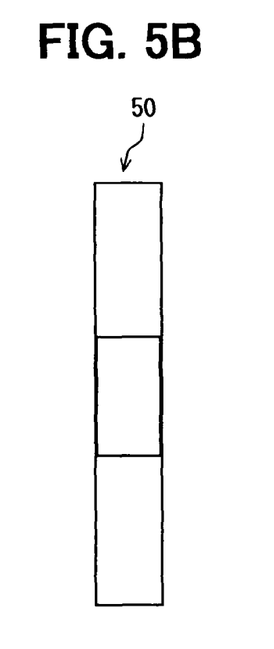
FIG. 5B is a front view showing a spring in the load sensor.

The sensor includes the spring 30 and the base 20. Alternatively, the sensor may include another spring 50 and another base 22, which are shown in FIGS. 5A and 5B. The spring 50 has a beam, both ends of which are supported. Specifically, the spring has a both-end-clamped cantilever structure. A connection portion 51 of the spring 50 is bonded to a connection portion 23 of the base 22 by a welding method. The spring 50 has a connecting member 53 with a thickness, which is thicker than the spring 30. Here, the thickness of the connecting member 53 is measured along with a direction sandwiching the load detection element 10.

Figure 6A:
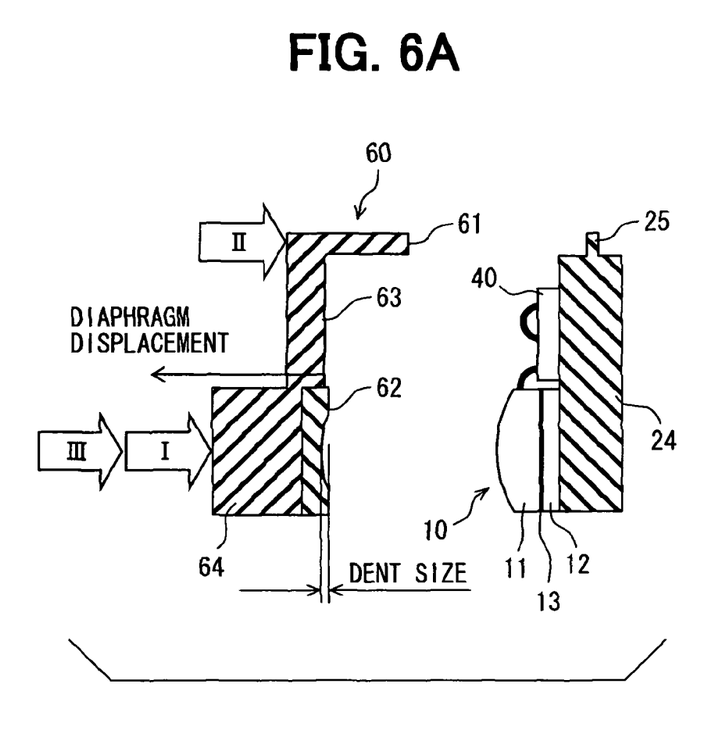
FIG. 6A is an exploded diagram showing a method for manufacturing a load sensor according to another modification of the example embodiment.
Figure 6B:
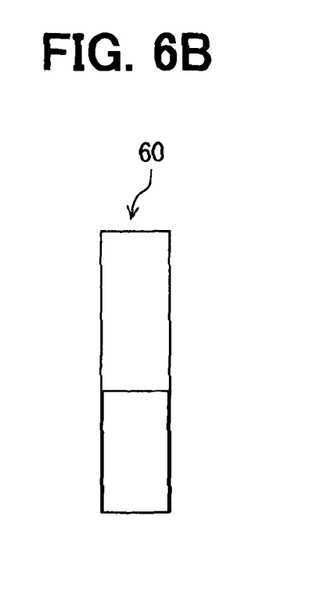
FIG. 6B is a front view showing a spring in the load sensor.

Alternatively, the sensor may include another spring 60 and another base 24, which are shown in FIGS. 6A and 6B. The spring 60 has a cantilever structure, so that one end of the spring 60 is supported. A connection portion 61 of the spring 60 is bonded to a connection portion 25 of the base 24 by a welding method.

The above disclosure has the following aspects.

According to a first aspect of the present disclosure, a method for manufacturing a load sensor including a load detection element and a support element, wherein the support element includes a base for mounting the load detection element on one side of the base and a spring for applying a preliminary load on the load detection element, wherein the spring includes a support portion for sandwiching the load detection element between the one side of the base and the support portion, a connection portion bonding to the base, and a connecting member for coupling the support portion and the connection portion, and wherein the support element transmits a detection load to the load detection element via the base and the spring, the method includes: sandwiching the load detection element between the base and the spring; bonding the connection portion of the spring on the base so that the connecting member of the spring is deformed beyond the elastic deformation region to reach the plastic deformation region; pressing the support portion so that a contact surface of the support portion is plastically deformed, wherein the contact surface contacts the load detection element; and returning deformation of the connecting member to be in the elastic deformation region.

In the bonding the spring on the base, the connecting member of the spring is deformed beyond the elastic deformation region to reach the plastic deformation region, and thereby, variation of parts in the load sensor is adjusted or controlled. Further, the contact surface of the support portion is plastically deformed, so that the deformation of the connecting member is returned to be in the elastic deformation region. Thus, durability of the spring is improved, and durability of the load sensor is improved.

Here, the preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

Alternatively, in the returning the deformation, the deformation of the connecting member is returned to maintain the deformation of the connecting member within the elastic deformation region when the detection load has a predetermined variation range and atmospheric temperature has a predetermined variation range.

In the above case, when the load sensor is actually used, the deformation of the connecting member of the spring is always in the elastic deformation region. Accordingly, the preliminary load is stably and continuously applied to the load detection element.

Alternatively, the load detection element has a contact portion, which contacts the contact surface of the support portion. The contact portion is made of alumina. The support portion is made of stainless steel. The connecting member is made of carbon steel.

By selecting material of each part of the sensor, the variation of the preliminary load caused by thermal expansion is minimized. For example, a center value of the variation of the preliminary load is set to be zero. Here, the linear heat expansion coefficient of the alumina is $7.2 \times 10^{-6}/°C$., the linear heat expansion coefficient of the carbon steel such as S35C and SCM435 is $10.8\text{-}11.4 \times 10^{-6}/°C$., and the linear heat expansion coefficient of the stainless steel such as SUS304 and SUS305 is $17.3 \times 10^{-6}/°C$. Thickness of each part is set in such a manner that a sum of the linear heat expansion coefficient multiplied by a thickness in the connecting member and the linear heat expansion coefficient multiplied by a thickness in the load detection element is equal to the linear heat expansion coefficient multiplied by a thickness in the support portion. Thus, they are cancelled with each other, so that influence of heat is minimized. Specifically, the variation of the load caused by displacement of each part of the sensor is minimized.

Alternatively, the spring has a rigidity along with a direction, to which the load detection element is pressed on the base, and the rigidity of the spring along with the direction is smaller than a rigidity of the spring along with another direction.

In the above case, if a load is applied to the sensor along with a direction different from a predetermined direction, influence of the load in the direction on the detection load is minimized.

Further, the base has a disk shape. The support portion has a columnar shape. The connection portion has a cylindrical shape with one edge, which is bonded to a periphery of the base. The connecting member has a diaphragm shape, which couples with the other end of the cylindrical shape of the connection portion so that the diaphragm shape covers an opening of the cylindrical shape, and the diaphragm shape has a thin plate shape.

Alternatively, the load detection element includes a pressure sensitive element and a pair of insulation elements. The pressure sensitive element is sandwiched between the pair of insulation elements so that both opposing sides of the pressure sensitive element are integrally covered with the pair of insulation elements. The pressure sensitive element has an electric property, which is changeable in accordance with a stress applied to the pressure sensitive element. The pressure sensitive element is formed from a matrix and a conductive particle. The matrix is made of glass, and the conductive particle is made of $RuO_2$, and the conductive particle is dispersed in the matrix.

In the above case, the sensor has high sensitivity and high accuracy to detect the load.

According to a second aspect of the present disclosure, a load sensor includes: a load detection element; and a support element. The support element includes a base and a spring. The load detection element is mounted on one side of the base. The spring includes a support portion for sandwiching the load detection element between the one side of the base and the support portion, a connection portion connecting to the base, and a connecting member for coupling the support portion and the connection portion. The support portion includes a contact surface, which is plastically deformed. The contact surface contacts the load detection element. The spring is deformed so that the spring applies a preliminary load on the load detection element. The deformation of the spring provides to maintain the deformation of the connecting member within the elastic deformation region when a detection load has a predetermined variation range, and the support element transmits the detection load to the load detection element via the base and the spring.

In the above sensor, the deformation of the connecting member is in the elastic deformation range, so that the spring has excellent durability, and the preliminary load is applied to the load detection element stably. The preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

According to a third aspect of the present disclosure, a method for manufacturing a load sensor including a load detection element and a support element, the method includes: mounting the load detection element on one side of a base of the support element; sandwiching the load detection element between the one side of the base and a support portion of a spring of the support element; applying a first preliminary load on the load detection element via the support portion of the spring so that a dent is formed on a contact surface of the support portion, wherein the contact surface contacts the load detection element; applying a second preliminary load on a connection portion of the spring so that the connection portion contacts the base so that a connecting member of the spring is deformed beyond the elastic deformation region to reach the plastic deformation region, wherein the connecting member couples the support portion and the connection portion; bonding the base and the connection portion; applying a third preliminary load on the support portion via the support portion so that the contact surface of the support portion is plastically deformed and the dent on the contact surface becomes large; and returning deformation of the connecting member to be in the elastic deformation region. The support element transmits a detection load to the load detection element via the base and the spring.

The connecting member of the spring is deformed beyond the elastic deformation region to reach the plastic deformation region, and thereby, variation of parts in the load sensor is adjusted or controlled. Further, the contact surface of the support portion is plastically deformed, so that the deformation of the connecting member is returned to be in the elastic deformation region. Thus, durability of the spring is improved, and durability of the load sensor is improved.

The preliminary load is controllable by adjusting the deformation of the connecting member of the spring and by controlling the plastic deformation of the support portion.

The load is applied to the load detection element via the support portion of the spring. When the support portion is made of certain material, and the support portion is deformed plastically, the work hardening proceeds so that the preliminary load is stably maintained.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for manufacturing a load sensor including a load detection element and a support element, wherein the support element includes a base for mounting the load detection element on one side of the base and a spring for applying a preliminary load on the load detection element, wherein the spring includes a support portion for sandwiching the load detection element between the one side of the base and the support portion, a connection portion bonding to the base, and a connecting member for coupling the support portion and the connection portion, and wherein the support element transmits a detection load to the load detection element via the base and the spring, the method comprising:

sandwiching the load detection element between the base and the spring;

bonding the connection portion of the spring on the base so that the connecting member of the spring is deformed beyond the elastic deformation region to reach the plastic deformation region;

pressing the support portion so that a contact surface of the support portion is plastically deformed, wherein the contact surface contacts the load detection element; and returning deformation of the connecting member to be in the elastic deformation region.

2. The method according to claim 1, wherein, in the returning the deformation, the deformation of the connecting member is returned to maintain the deformation of the connecting member within the elastic deformation region when the detection load has a predetermined variation range and atmospheric temperature has a predetermined variation range.

3. The method according to claim 1, wherein the load detection element has a contact portion, which contacts the contact surface of the support portion, wherein the contact portion is made of alumina, wherein the support portion is made of stainless steel, and wherein the connecting member is made of carbon steel.

4. The method according to claim 1,
wherein the spring has a rigidity along with a direction, to which the load detection element is pressed on the base, and
wherein the rigidity of the spring along with the direction is smaller than a rigidity of the spring along with another direction.

5. The method according to claim 1,
wherein the base has a disk shape,
wherein the support portion has a columnar shape,
wherein the connection portion has a cylindrical shape with one edge, which is bonded to a periphery of the base,
wherein the connecting member has a diaphragm shape, which couples with the other end of the cylindrical shape of the connection portion so that the diaphragm shape covers an opening of the cylindrical shape, and
wherein the diaphragm shape has a thin plate shape.

6. The method according to claim 1,
wherein the load detection element includes a pressure sensitive element and a pair of insulation elements,
wherein the pressure sensitive element is sandwiched between the pair of insulation elements so that both opposing sides of the pressure sensitive element are integrally covered with the pair of insulation elements,
wherein the pressure sensitive element has an electric property, which is changeable in accordance with a stress applied to the pressure sensitive element,
wherein the pressure sensitive element is formed from a matrix and a conductive particle,
wherein the matrix is made of glass, and the conductive particle is made of $RuO_2$, and
wherein the conductive particle is dispersed in the matrix.

7. The method according to claim 1, wherein the plastically deformed contact surface of the support portion includes a dent which is work-hardened and plastically deformed.

8. A load sensor comprising:
a load detection element; and
a support element,
wherein the support element includes a base and a spring,
wherein the load detection element is mounted on one side of the base,
wherein the spring includes a support portion for sandwiching the load detection element between the one side of the base and the support portion, a connection portion connecting to the base, and a connecting member for coupling the support portion and the connection portion,
wherein the support portion includes a contact surface, which is plastically deformed,
wherein the contact surface contacts the load detection element,
wherein the spring is deformed so that the spring applies a preliminary load on the load detection element,
wherein deformation of the spring provides to maintain the deformation of the connecting member within the elastic deformation region when a detection load has a predetermined variation range,
wherein the support element transmits the detection load to the load detection element via the base and the spring,
wherein the support portion includes a dent, which is work-hardened and plastically deformed,
wherein the support portion press-contacts the load detection member, and
wherein the load detection element is attached to the dent.

9. The load sensor according to claim 8,
wherein the load detection element has a contact portion, which contacts the contact surface of the support portion,
wherein the contact portion is made of alumina,
wherein the support portion is made of stainless steel, and
wherein the connecting member is made of carbon steel.

10. The load sensor according to claim 8,
wherein the spring has a rigidity along with a direction, to which the load detection element is pressed on the base, and
wherein the rigidity of the spring along with the direction is smaller than a rigidity of the spring along with another direction.

11. The load sensor according to claim 8,
wherein the base has a disk shape,
wherein the support portion has a columnar shape,
wherein the connection portion has a cylindrical shape with one edge, which is bonded to a periphery of the base,
wherein the connecting member has a diaphragm shape, which couples with the other end of the cylindrical shape of the connection portion so that the diaphragm shape covers an opening of the cylindrical shape, and
wherein the diaphragm shape has a thin plate shape.

12. The load sensor according to claim 8,
wherein the load detection element includes a pressure sensitive element and a pair of insulation elements,
wherein the pressure sensitive element is sandwiched between the pair of insulation elements so that both opposing sides of the pressure sensitive element are integrally covered with the pair of insulation elements,
wherein the pressure sensitive element has an electric property, which is changeable in accordance with a stress applied to the pressure sensitive element,
wherein the pressure sensitive element is formed from a matrix and a conductive particle,
wherein the matrix is made of glass, and the conductive particle is made of $RuO_2$, and
wherein the conductive particle is dispersed in the matrix.

13. A method for manufacturing a load sensor including a load detection element and a support element, the method comprising:
mounting the load detection element on one side of a base of the support element;
sandwiching the load detection element between the one side of the base and a support portion of a spring of the support element;
applying a first preliminary load on the load detection element via the support portion of the spring so that a dent is formed on a contact surface of the support portion, wherein the contact surface contacts the load detection element;
applying a second preliminary load on a connection portion of the spring so that the connection portion contacts the base so that a connecting member of the spring is deformed beyond the elastic deformation region to reach the plastic deformation region, wherein the connecting member couples the support portion and the connection portion;
bonding the base and the connection portion;
applying a third preliminary load on the support portion via the support portion so that the contact surface of the support portion is plastically deformed and the dent on the contact surface becomes large; and
returning deformation of the connecting member to be in the elastic deformation region,
wherein the support element transmits a detection load to the load detection element via the base and the spring.

* * * * *